(12) United States Patent
Mikos

(10) Patent No.: US 10,915,482 B2
(45) Date of Patent: *Feb. 9, 2021

(54) ALIGNING RECEIVED BAD DATA INDICATORS (BDIS) WITH RECEIVED DATA ON A CROSS-CHIP LINK

(71) Applicant: International Business Machines Corporation, Armonk, NY (US)

(72) Inventor: James F. Mikos, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/536,883

(22) Filed: Aug. 9, 2019

(65) Prior Publication Data

US 2019/0361829 A1   Nov. 28, 2019

Related U.S. Application Data

(63) Continuation of application No. 15/708,482, filed on Sep. 19, 2017, now Pat. No. 10,474,611.

(51) Int. Cl.
  *G06F 13/40* (2006.01)
  *G06F 11/00* (2006.01)
  *G06F 13/42* (2006.01)

(52) U.S. Cl.
  CPC ........ *G06F 13/4022* (2013.01); *G06F 11/006* (2013.01); *G06F 13/4282* (2013.01)

(58) Field of Classification Search
  None
  See application file for complete search history.

(56) References Cited

U.S. PATENT DOCUMENTS

| 6,006,286 | A | 12/1999 | Baker et al. |
| 6,751,698 | B1 * | 6/2004 | Deneroff ........... G06F 15/17343 710/317 |
| 7,010,607 | B1 | 3/2006 | Bunton |
| 7,047,475 | B2 | 5/2006 | Sharma et al. |
| 7,296,181 | B2 | 11/2007 | Safford et al. |
| 9,432,298 | B1 * | 8/2016 | Smith ................. H04L 49/9057 |

(Continued)

OTHER PUBLICATIONS

Appendix P; List of IBM Patent or Applications Treated as Related, Aug. 9, 2019, 2 pages.

(Continued)

*Primary Examiner* — Henry Tsai
*Assistant Examiner* — Christopher A Bartels
(74) *Attorney, Agent, or Firm* — Jason Sosa

(57) ABSTRACT

Aligning received BDIs with received data on a cross-chip link including receiving, from the cross-chip link, a control flit comprising incoming data flit information for a plurality of incoming data flits; adding the incoming data flit information to a control structure; receiving, from the cross-chip link, the plurality of incoming data flits; directing each of the plurality of incoming data flits to virtual channel queues based on the incoming data flit information at a first read pointer in the control structure; receiving a bookend flit comprising a plurality of BDIs for the plurality of data flits; and associating each of the BDIs with the plurality of data flits based on the incoming data flit information at a second read pointer in the control structure.

13 Claims, 6 Drawing Sheets

(56) References Cited

U.S. PATENT DOCUMENTS

| | | |
|---|---|---|
| 9,692,402 B2 | 6/2017 | Wagh et al. |
| 10,474,611 B2 | 11/2019 | Mikos |
| 2002/0026645 A1 | 2/2002 | Son et al. |
| 2004/0213291 A1 | 10/2004 | Beshai et al. |
| 2005/0080869 A1* | 4/2005 | Bender .................. H04L 29/06 709/212 |
| 2007/0011223 A1 | 1/2007 | Calvignac et al. |
| 2007/0266179 A1* | 11/2007 | Chavan ............... G06F 13/4022 709/250 |
| 2011/0106999 A1 | 5/2011 | Love |
| 2014/0040527 A1* | 2/2014 | Kanigicherla ...... G06F 13/4022 710/316 |
| 2014/0112339 A1 | 4/2014 | Safranek et al. |
| 2014/0281057 A1* | 9/2014 | Cohen ..................... G06F 3/061 710/52 |
| 2015/0006962 A1 | 1/2015 | Swanson et al. |
| 2015/0234602 A1 | 8/2015 | Seo et al. |
| 2016/0077964 A1* | 3/2016 | Chang ................. G06F 12/0253 711/103 |
| 2016/0182186 A1* | 6/2016 | Adler ............... H04L 12/40045 714/776 |
| 2019/0087371 A1 | 3/2019 | Mikos |
| 2019/0087372 A1 | 3/2019 | Mikos |

OTHER PUBLICATIONS

Appendix P; List of IBM Patent or Applications Treated as Related, Jan. 9, 2020, 2 pages.

\* cited by examiner

ALIGNING RECEIVED BAD DATA INDICATORS (BDIS) WITH RECEIVED DATA ON A CROSS-CHIP LINK

CROSS-REFERENCE TO RELATED APPLICATION

This application is a continuation application of and claims priority from U.S. patent application Ser. No. 15/708,482, filed Sep. 19, 2017.

BACKGROUND

Field of the Invention

The field of the invention is data processing, or, more specifically, methods, apparatus, and products for aligning received bad data indicators (BDIs) with received data on a cross-chip link.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

SUMMARY

Methods, systems, and apparatus for aligning received bad data indicators (BDIs) with received data on a cross-chip link are disclosed in this specification. Aligning received BDIs with received data on a cross-chip link includes receiving, from the cross-chip link, a control flit comprising incoming data flit information for a plurality of incoming data flits; adding the incoming data flit information to a control structure; receiving, from the cross-chip link, the plurality of incoming data flits; directing each of the plurality of incoming data flits to virtual channel queues based on the incoming data flit information at a first read pointer in the control structure; receiving a bookend flit comprising a plurality of BDIs for the plurality of data flits; and associating each of the BDIs with the plurality of data flits based on the incoming data flit information at a second read pointer in the control structure.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
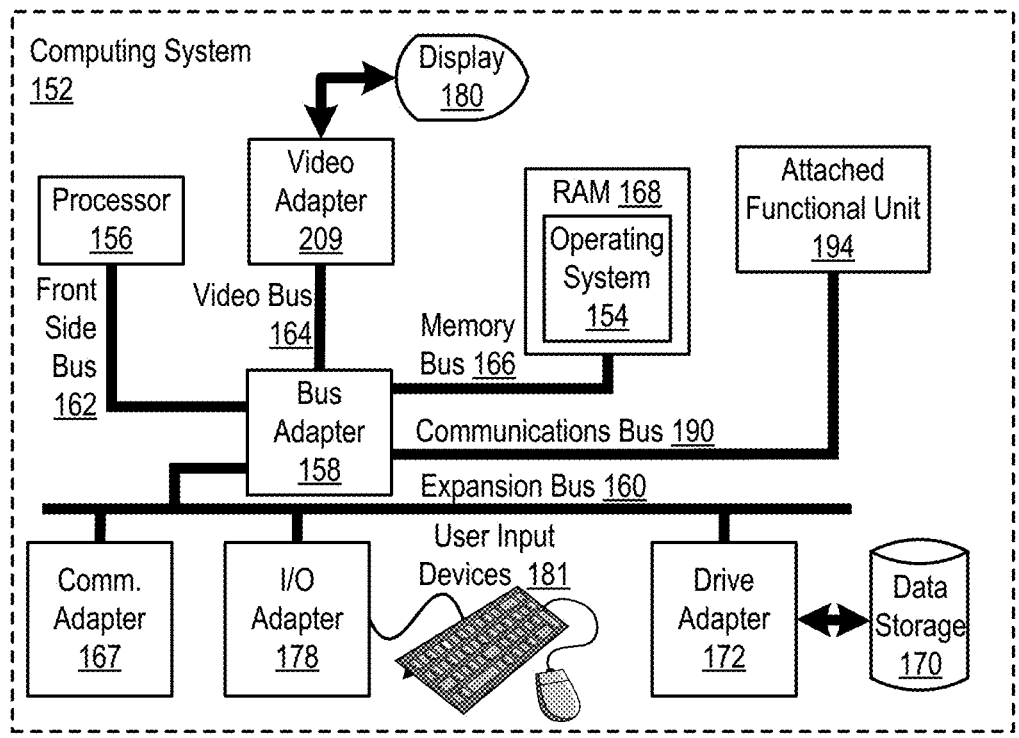
FIG. 1 sets forth a block diagram of an example system configured for aligning received bad data indicators (BDIs) with received data on a cross-chip link according to embodiments of the present invention.

Exemplary methods, apparatus, and products for direct memory access between an accelerator and a processor using a coherency adapter in accordance with the present invention are described with reference to the accompanying drawings, beginning with FIG. 1. FIG. 1 sets forth a block diagram of automated computing machinery comprising an exemplary computing system (152) configured for direct memory access between an accelerator and a processor using a coherency adapter according to embodiments of the present invention. The computing system (152) of FIG. 1 includes at least one computer processor (156) or 'CPU' as well as random access memory (168) ('RAM') which is connected through a high speed memory bus (166) and bus adapter (158) to processor (156) and to other components of the computing system (152).

Stored in RAM (168) is an operating system (154). Operating systems useful in computers configured for direct memory access between an accelerator and a processor using a coherency adapter according to embodiments of the present invention include UNIX™, Linux™, Microsoft XP™, AIX™, IBM's i5/OS™, and others as will occur to those of skill in the art. The operating system (154) in the example of FIG. 1 is shown in RAM (168), but many components of such software typically are stored in non-volatile memory also, such as, for example, on a disk drive (170).

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of disk drive (170). Disk drive adapters useful in computers configured for direct memory access between an accelerator and a processor using a coherency adapter according to embodiments of the present invention include Integrated Drive Electronics ('IDE') adapters, Small Computer System Interface (SCSI) adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computing system (152) of FIG. 1 includes a communications adapter (167) for data communications with other computers (182) and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for direct memory access between an accelerator and a processor using a coherency adapter according to embodiments of the present invention include modems for wired dial-up communications, Ethernet (IEEE 802.3) adapters for wired data communications, and 802.11 adapters for wireless data communications.

The exemplary computing system (152) of FIG. 1 includes a communications bus (190) that connects the processor (156) and RAM (168) (via the bus adapter (158)) to the attached functional unit (194). The processor (156) may include an open coherent accelerator proxy interface facilitating communication with the attached functional unit (194) on a cross-chip link.

Figure 2:
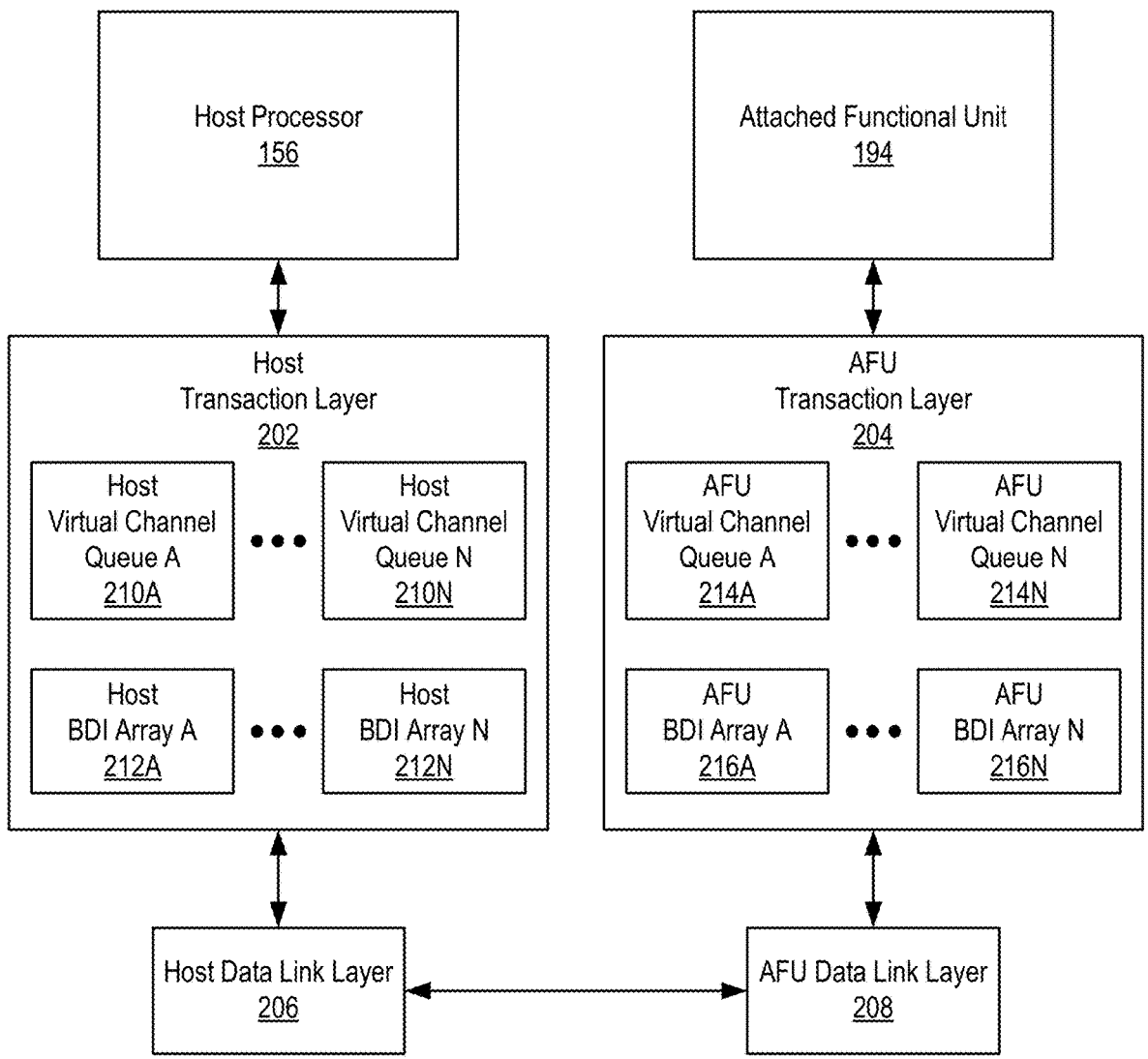
FIG. 2 sets forth a block diagram of an example system configured for aligning received BDIs with received data on a cross-chip link according to embodiments of the present invention.

FIG. 2 is an example block diagram of a system configured for aligning received bad data indicators (BDIs) with received data on a cross-chip link. FIG. 2 includes a host processor (156) coupled to an attached functional unit (AFU) (194) via a host transaction layer (202), a host data link layer (206), an AFU data link layer (208) and an AFU transaction layer (204). The host transaction layer (202) includes multiple host virtual channel queues (host virtual channel queue A (210A), host virtual channel queue N (210N)) each associated with a host bad data indicator (BDI) array (host BDI array A (212A), host BDI array N (212N)). The AFU transaction layer (204) includes multiple AFU virtual channel queues (AFU virtual channel queue A (214A), AFU virtual channel queue N (214N)) each associated with an AFU BDI array (AFU BDI array A (216A), AFU BDI array N (216N)).

The AFU (194) is a processing unit configured to extend the functionality of the computing system. The AFU (194) may be a removable component of the computing system installed to perform a specific task or group of tasks. The AFU (194) may be a field programmable gate array (FPGA). Example AFUs (194) include, for example, network interface cards, graphics accelerator cards, and storage adapter cards.

The host processor (156) and the AFU (194) exchange data using frames. A frame is a group of three types of flits—a control flit, one or more data flits, and a bookend flit. A flit, as the term is used in this specification, is a portion of a network packet. The control flit includes operation codes (opcodes) (e.g., read instructions, write instructions) and virtual channel (VC) identifiers for the incoming data flits. The control flit may also indicate the number and size of incoming data flits to be expected. The data flits include the data subject to the opcodes in the control flit. Further, the data flits may include only data, and may lack routing or descriptions of the data. The bookend flit includes BDIs (also referred to as poison bits) for any of the previously received data flits that are subject to a read or send error. The bookend flit also indicates that the frame has passed a cyclic redundancy check (CRC).

The BDIs received in the bookend flit indicate processor-sourced errors. Specifically, BDIs may indicate that an error has occurred in the reading of the data within the data flit and the data should not be used. The BDIs refer to data flit errors independent of transmission errors indicated by the CRC. The data and associated BDIs are received independent of one other. Specifically, the data may be received before, and in a separate flit from, the BDIs associated with the data.

The flits within the frames are received in order based on the control flit. For example, the transaction layer (host transaction layer (202), AFU transaction layer (204)) may receive a control flit indicating an amount of incoming data flits. The transaction layer (host transaction layer (202), AFU transaction layer (204)) then parses the control flit and prepares to receive the data flits indicated in the control flit. Following the control flit, the transaction layer (host transaction layer (202), AFU transaction layer (204)) receives the data flits referred to by the control flit. Once each of the incoming data flits referred to by the control flit have been received, the transaction layer (host transaction layer (202), AFU transaction layer (204)) receives the bookend flit. The transaction layer (host transaction layer (202), AFU transaction layer (204)) then parses the bookend flit and associates any BDIs in the bookend flit with previously-received data from the data flits.

The exchange of frames is performed by the transaction layers (host transaction layer (202), AFU transaction layer (204)) and the data link layers (host data link layer (206), AFU data link layer (208)). The data link layers (host data link layer (206), AFU data link layer (208)) are coupled to one another via a cross-chip link. The cross-chip link is a physical communication layer between the data link layers (host data link layer (206), AFU data link layer (208)) and represents the physical medium across which the frame is transmitted.

The data link layers (host data link layer (206), AFU data link layer (208)) receive the signals sent across the cross-chip link and provide those signals as flits to the transaction layers (host transaction layer (202), AFU transaction layer (204)). The transaction layer (host transaction layer (202), AFU transaction layer (204)) logic is hardware, software, or an aggregation of hardware and software that receives the frame as a set of flits from the data link layers (host data link layer (206), AFU data link layer (208)) and organizes the opcodes, data, and BDIs for consumption by the processing units (host processor (156), AFU (194)).

The virtual channel queues (host virtual channel queue A (210A), host virtual channel queue N (210N), AFU virtual channel queue A (214A), AFU virtual channel queue N (214N)) are used by the transaction layers (host transaction layer (202), AFU transaction layer (204)) to store the data received from the data link layer (host data link layer (206), AFU data link layer (208)). Specifically, the transaction layer (host transaction layer (202), AFU transaction layer (204)) selects the virtual channel queue based on the content of the control flit and places the associated data from the later-received data flit in the selected virtual channel queue. The virtual channel queues (host virtual channel queue A (210A), host virtual channel queue N (210N), AFU virtual channel queue A (214A), AFU virtual channel queue N (214N)) may be first-in-first-out (FIFO) queues presented to the processing units.

Each entry in the virtual channel queues (host virtual channel queue A (210A), host virtual channel queue N (210N), AFU virtual channel queue A (214A), AFU virtual channel queue N (214N)) may be associated with (i.e., parallel to) an entry in the BDI arrays (host BDI array A (212A), host BDI array N (212N), AFU BDI array A (216A), AFU BDI array N (216N)). The BDI arrays (host BDI array A (212A), host BDI array N (212N), AFU BDI array A (216A), AFU BDI array N (216N)) store BDIs for the data in the virtual channel queues (host virtual channel queue A (210A), host virtual channel queue N (210N), AFU virtual channel queue A (214A), AFU virtual channel queue N (214N)). Specifically, the transaction layers (host transaction layer (202), AFU transaction layer (204)) parse the bookend flit to extract the BDIs and select the destination BDI array entry associated (i.e. parallel to) the entry in the virtual queue storing the data to which the BDI applies. Associated entries in the virtual queues and BDI arrays are presented to the processing unit to be read together. Specifically, the processing units may read an entry in the virtual queue and the associated entry in the BDI array together such that the processing units receive the data and BDI in one procedure.

Figure 3:
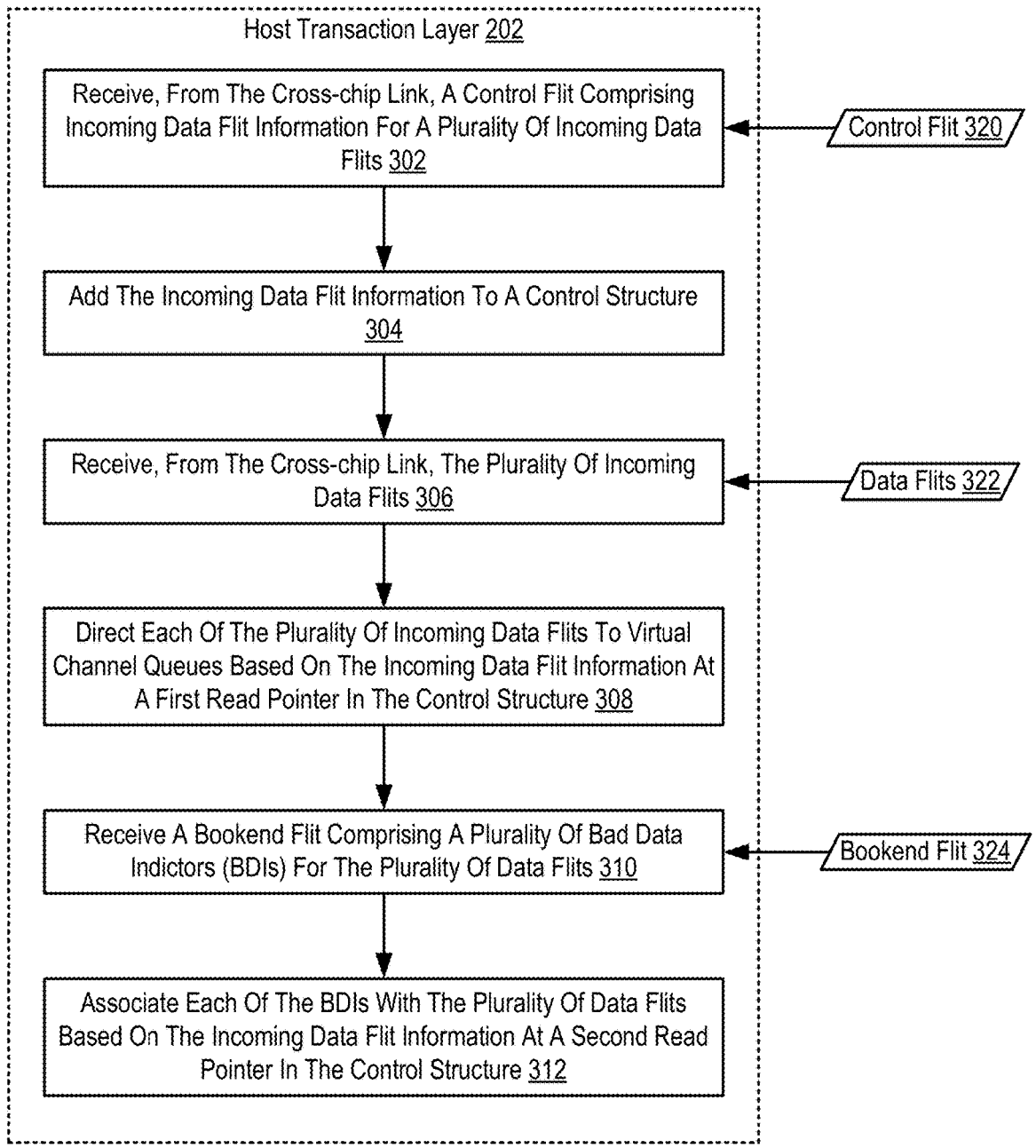
FIG. 3 sets forth a flow chart illustrating an exemplary method for aligning received BDIs with received data on a cross-chip link according to embodiments of the present invention.

For further explanation, FIG. 3 sets forth a flow chart illustrating an exemplary method for aligning received BDIs with received data on a cross-chip link according to embodiments of the present invention that includes receiving (302), from the cross-chip link, a control flit (320) comprising incoming data flit information for a plurality of incoming data flits (322). Receiving (302), from the cross-chip link, a control flit (320) comprising incoming data flit information for a plurality of incoming data flits (322) may be carried out by receiving, by a transaction layer, the control flit (320) from a data link layer between the transaction layer and the cross-chip link. The control flit (320) may be received as the first flit of a frame from an AFU. The incoming data flit information may include a virtual channel identifier and a length of each of the plurality of incoming data flits. The virtual channel identifier distinguishes one virtual channel queue from other virtual channel queues. The length of each of the plurality of data flits may include a data length (e.g., 64 bytes). Further, the data flits may be of varying lengths.

The method of FIG. 3 further includes adding (304) the incoming data flit information to a control structure. Adding (304) the incoming data flit information to a control structure may be carried out by placing the virtual channel identifier and data lengths in entries in the control structure and advancing a write pointer in the control structure. The control structure is a data structure used by the transaction layer to track incoming frames, direct the data within the frames to the destination virtual channel queues, and apply the BDIs for any of the data in frames to the correct data flits. Each entry in the control structure may include a virtual channel identifier and a data length.

The method of FIG. 3 further includes receiving (306), from the cross-chip link, the plurality of incoming data flits (322). Receiving (306), from the cross-chip link, the plurality of incoming data flits (322) may be carried out by receiving, by the transaction layer, the data flit (322) from a data link layer. The data flits (322) may be received after the control flit (320) and before the bookend flit (324).

The number of data flits received may be indicated by the incoming data flit information. Specifically, the control flit (320) may include a number of opcodes, some or all of which are associated with an incoming data flit (322). The transaction layer may use the opcodes in the control flit (320) to prepare the control structure to receive and direct the data flits (322) into the correct destination virtual channel queues.

The method of FIG. 3 further includes directing (308) each of the plurality of incoming data flits (322) to virtual channel queues based on the incoming data flit information at a first read pointer in the control structure. Directing (308) each of the plurality of incoming data flits (322) to virtual channel queues based on the incoming data flit information at a first read pointer in the control structure may be carried out by retrieving, from the control structure at the first read pointer, a virtual channel identifier; selecting a virtual channel queue based on the virtual channel identifier; and storing the incoming data flit in an entry in the selected virtual channel queue.

The method of FIG. 3 further includes receiving (310) a bookend flit (324) comprising a plurality of BDIs for the plurality of data flits (322). Receiving (310) a bookend flit (324) comprising a plurality of BDIs for the plurality of data flits (322) may be carried out by receiving, by a transaction layer, a bookend flit (324) that includes the BDIs for the plurality of data flits from a data link layer. The bookend flit (324) may be received as the final flit of a frame from the AFU.

The bookend flit (324) may indicate that the transmission of the frame on the cross-chip link has been successful (i.e., a successful CRC has been completed). However, some data flits within the frame may be subject to other processor-sourced errors indicated by the BDIs. If any of the previously received data flits are subject to such errors, the bookend flit (324) may indicate as much using corresponding BDIs.

The method of FIG. 3 further includes associating (312) each of the BDIs with the plurality of data flits (324) based on the incoming data flit information at a second read pointer in the control structure. Associating (312) each of the BDIs with the plurality of data flits (324) based on the incoming data flit information at a second read pointer in the control structure may be carried out by retrieving, from the control structure at the second read pointer, a virtual channel identifier; selecting a BDI array based on the virtual channel identifier; and storing the BDI in an entry in the selected BDI array.

For example, assume a control flit (320) arrives with three opcodes, each with associated data. The first opcode is a write for a 64 byte data flit into virtual channel queue A. The second opcode is a write for a 64 byte data flit into virtual channel queue B. The third opcode is a write for a 64 byte data flit into virtual channel queue C. A first entry in the control structure is written for the first opcode and includes a virtual channel identifier for virtual channel A and a data length of 64 bytes. A second entry in the control structure is written for the first opcode and includes a virtual channel identifier for virtual channel B and a data length of 64 bytes. A third entry in the control structure is written for the third opcode and includes a virtual channel identifier for virtual channel C and a data length of 64 bytes.

Continuing with the example, assume both read pointers begin at the first entry in the control structure. When the plurality of data flits (322) arrive, the transaction layer logic receives the first data flit and inspects the control structure at the first read pointer. Based on the content of the first entry indicated by the first read pointer, the transaction layer logic directs the 64 byte data flit to virtual channel A and advances the read pointer. The transaction layer logic then receives the second data flit and inspects the control structure at the first read pointer. Based on the content of the second entry indicated by the first read pointer, the transaction layer logic directs the 64 byte data flit to virtual channel B and advances the read pointer. The transaction layer logic then receives the third data flit and inspects the control structure at the first read pointer. Based on the content of the third entry indicated by the first read pointer, the transaction layer logic directs the 64 byte data flit to virtual channel C and advances the read pointer.

Continuing with the example, the transaction layer logic may then receive a bookend flit (324) that includes three BDIs, with the first two indicating that no error occurred with the first two data flits, and the third BDI indicating that an error occurred with the third data flit. The transaction layer logic may reuse the control structure to associate the BDIs with the data flits. Specifically, the transaction layer logic inspects the first entry in control structure indicated by the second read pointer. Using the virtual channel identifier in the first entry, the transaction layer logic stores the first BDI in an entry in the BDI array associated with the first virtual channel queue that corresponds to the entry in the first virtual channel queue storing the first data flit. The transaction layer logic then advances the second read pointer. The transaction layer logic then inspects the second entry in control structure indicated by the second read pointer. Using the virtual channel identifier in the second entry, the transaction layer logic stores the second BDI in an entry in the BDI array associated with the second virtual channel queue that corresponds to the entry in the second virtual channel queue storing the second data flit. The transaction layer logic then advances the second read pointer. Finally, the transaction layer logic inspects the third entry in control structure indicated by the second read pointer. Using the virtual channel identifier in the third entry, the transaction layer logic stores the third BDI in an entry in the BDI array associated with the third virtual channel queue that corresponds to the entry in the third virtual channel queue storing the third data flit. The transaction layer logic then advances the second read pointer. The transaction layer logic may store the BDIs in the BDI arrays at a rate based on a clock of the host processing unit, such as one BDI per clock cycle.

The first read pointer may not remain ahead of the second read pointer. Specifically, the transaction layer logic may begin associating the BDIs with the data flits before the data flits are stored in the virtual channel queues. Therefore, the second read pointer may advance to entries in the control structure beyond the location in the control structure of the first read pointer.

Figure 4:
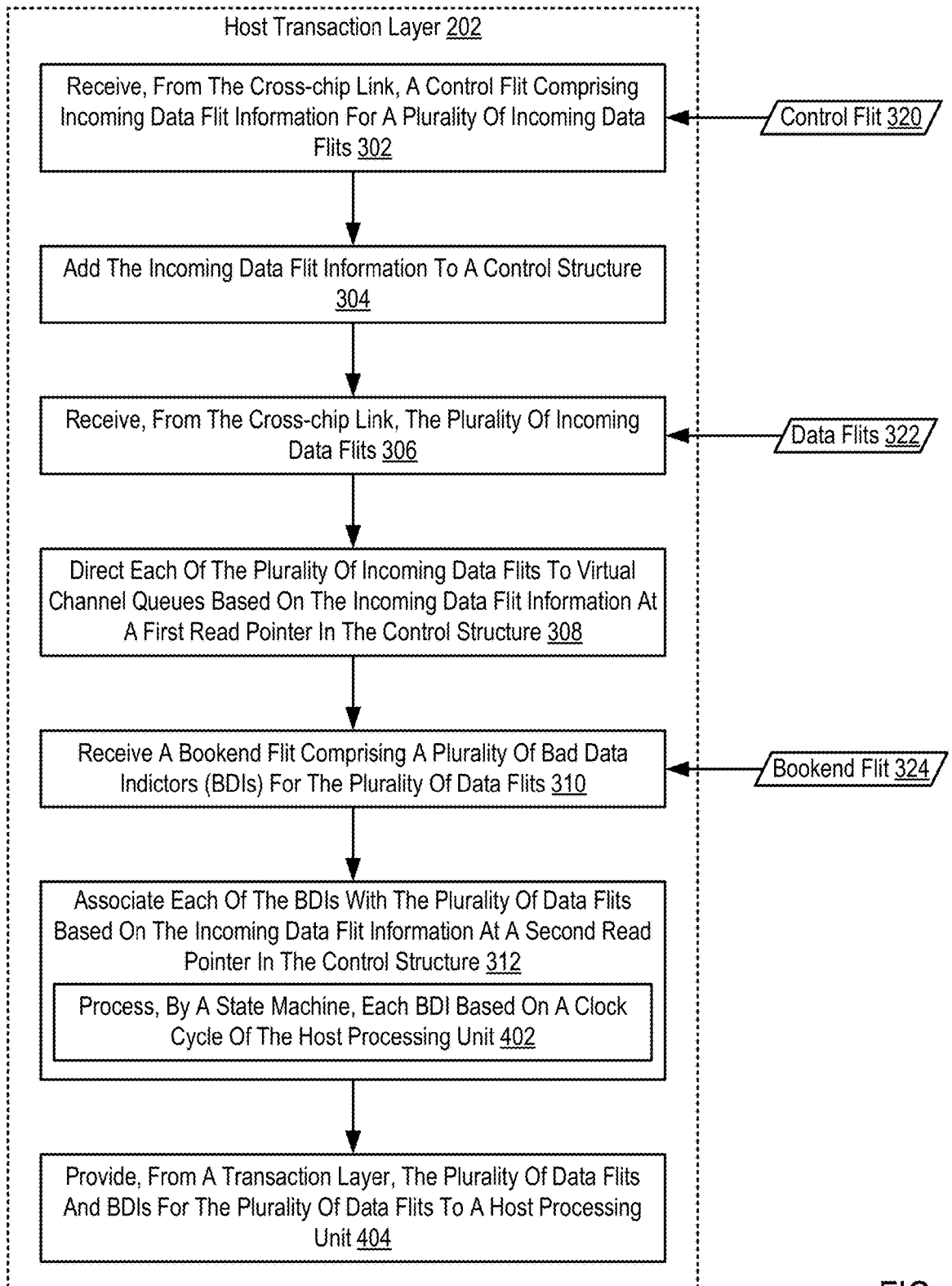
FIG. 4 sets forth a flow chart illustrating an exemplary method for aligning received BDIs with received data on a cross-chip link according to embodiments of the present invention.

For further explanation, FIG. 4 sets forth a flow chart illustrating a further exemplary method for aligning received BDIs with received data on a cross-chip link according to embodiments of the present invention that includes receiving (302), from the cross-chip link, a control flit (320) comprising incoming data flit information for a plurality of incoming data flits (322); adding (304) the incoming data flit information to a control structure; receiving (306), from the cross-chip link, the plurality of incoming data flits (322); directing (308) each of the plurality of incoming data flits (322) to virtual channel queues based on the incoming data flit information at a first read pointer in the control structure; receiving (310) a bookend flit (324) comprising a plurality of BDIs for the plurality of data flits (322); and associating (312) each of the BDIs with the plurality of data flits (324) based on the incoming data flit information at a second read pointer in the control structure.

The method of FIG. 4 differs from the method of FIG. 3, however, in that associating (312) each of the BDIs with the plurality of data flits (324) based on the incoming data flit information at a second read pointer in the control structure includes processing (402), by a state machine, each BDI based on a clock cycle of the host processing unit. Processing (402), by a state machine, each BDI based on a clock cycle of the host processing unit may be carried out by the transaction layer logic associating the BDIs with the data flits at a rate according to the clock cycles of the host processing unit. The host processing unit may have a clock speed greater than that of the AFUs or other communication endpoints. The transaction layer logic may utilize the same logic over a number of clock cycles to minimize the hardware necessary to associate the BDIs with the data flits.

The method of FIG. 4 further includes providing (404), from a transaction layer, the plurality of data flits (322) and BDIs for the plurality of data flits to a host processing unit. Providing (404), from a transaction layer, the plurality of data flits (322) and BDIs for the plurality of data flits to a host processing unit may be carried out by the transaction layer logic indicating to the host processing unit that data is available in a virtual queue for transfer to the host processing unit for processing. The indication by the transaction layer may be the advancement of a write pointer in the virtual channel queue.

The virtual channel queue may include two write pointers. The first write pointer may indicate a portion of the virtual channel queue containing data that has received an associated bookend flit indicating a successful transmission of the frame on the cross-chip link (i.e., a successful CRC has been completed). The second write pointer may indicate a portion of the virtual channel queue containing data that has received all associated BDIs.

Figure 5:
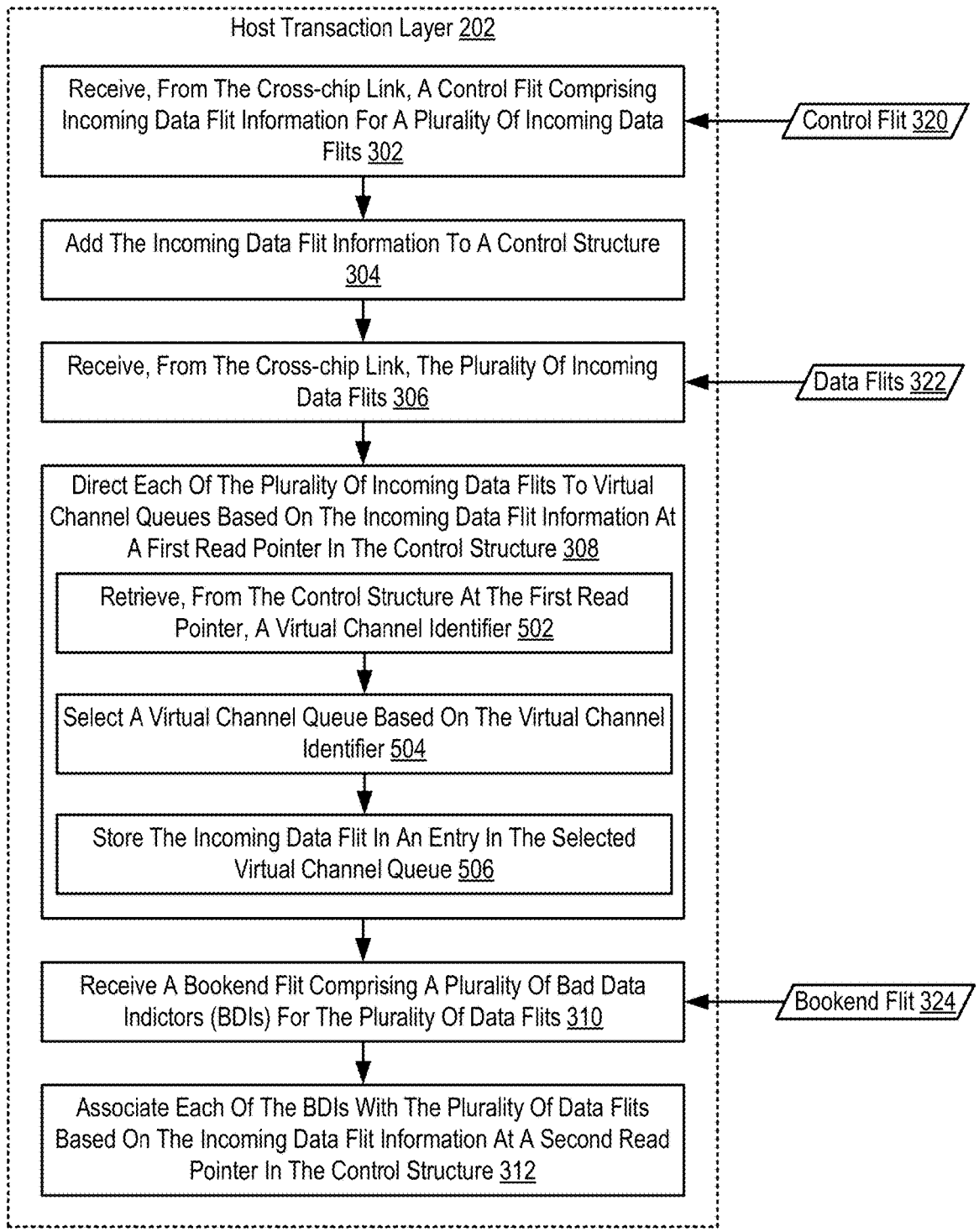
FIG. 5 sets forth a flow chart illustrating an exemplary method for aligning received BDIs with received data on a cross-chip link according to embodiments of the present invention.

For further explanation, FIG. 5 sets forth a flow chart illustrating a further exemplary method for aligning received BDIs with received data on a cross-chip link according to embodiments of the present invention that includes receiving (302), from the cross-chip link, a control flit (320) comprising incoming data flit information for a plurality of incoming data flits (322); adding (304) the incoming data flit information to a control structure; receiving (306), from the cross-chip link, the plurality of incoming data flits (322); directing (308) each of the plurality of incoming data flits (322) to virtual channel queues based on the incoming data flit information at a first read pointer in the control structure; receiving (310) a bookend flit (324) comprising a plurality of BDIs for the plurality of data flits (322); and associating (312) each of the BDIs with the plurality of data flits (324) based on the incoming data flit information at a second read pointer in the control structure.

The method of FIG. 5 differs from the method of FIG. 3, however, in that directing (308) each of the plurality of incoming data flits (322) to virtual channel queues based on the incoming data flit information at a first read pointer in the control structure includes retrieving (502), from the control structure at the first read pointer, a virtual channel identifier; selecting (504) a virtual channel queue based on the virtual channel identifier; and storing (506) the incoming data flit in an entry in the selected virtual channel queue.

Retrieving (502), from the control structure at the first read pointer, a virtual channel identifier may be carried out by determining the location of the first read pointer and accessing the control structure entry at the location. Selecting (504) a virtual channel queue based on the virtual channel identifier may be carried out by identifying the virtual channel queue using the virtual channel identifier. Storing (506) the incoming data flit in an entry in the selected virtual channel queue may be carried out by determining a location of a write pointer in the destination virtual channel queue. Once the destination virtual channel queue and entry are determined, the data flit is stored at the entry in the virtual channel queue.

Figure 6:
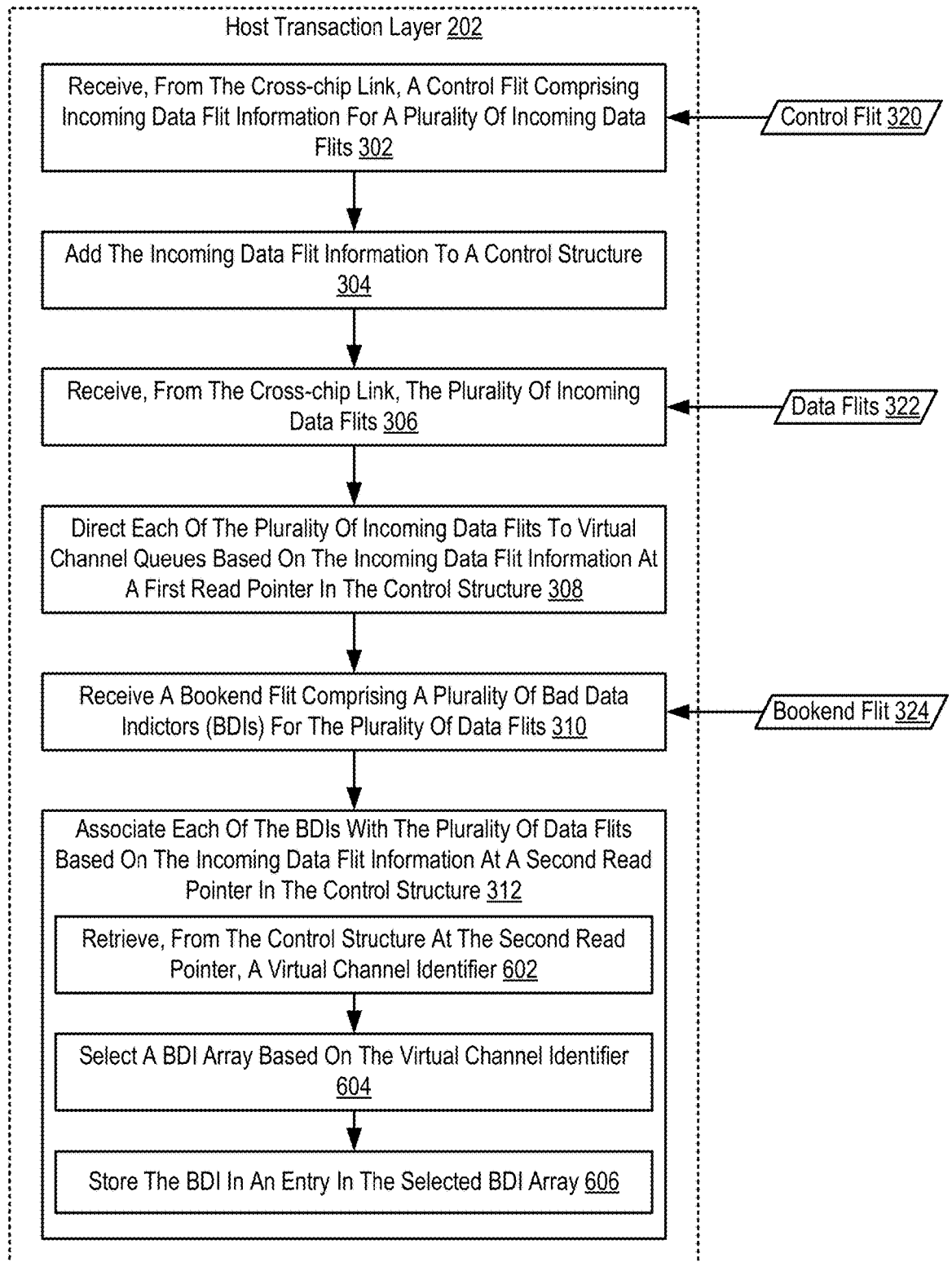
FIG. 6 sets forth a flow chart illustrating an exemplary method for aligning received BDIs with received data on a cross-chip link according to embodiments of the present invention.

For further explanation, FIG. 6 sets forth a flow chart illustrating a further exemplary method for aligning received BDIs with received data on a cross-chip link according to embodiments of the present invention that includes receiving (302), from the cross-chip link, a control flit (320) comprising incoming data flit information for a plurality of incoming data flits (322); adding (304) the incoming data flit information to a control structure; receiving (306), from the cross-chip link, the plurality of incoming data flits (322); directing (308) each of the plurality of incoming data flits (322) to virtual channel queues based on the incoming data flit information at a first read pointer in the control structure; receiving (310) a bookend flit (324) comprising a plurality of BDIs for the plurality of data flits (322); and associating (312) each of the BDIs with the plurality of data flits (324) based on the incoming data flit information at a second read pointer in the control structure.

The method of FIG. 6 differs from the method of FIG. 3, however, in that associating (312) each of the BDIs with the plurality of data flits (324) based on the incoming data flit information at a second read pointer in the control structure includes retrieving (602), from the control structure at the second read pointer, a virtual channel identifier; selecting (604) a BDI array based on the virtual channel identifier; and storing (606) the BDI in an entry in the selected BDI array.

Retrieving (602), from the control structure at the second read pointer, a virtual channel identifier may be carried out by determining the location of the second read pointer and accessing the control structure entry at the location. Selecting (604) a BDI array based on the virtual channel identifier may be carried out by identifying the virtual channel queue using the virtual channel identifier. Once the virtual channel queue is identified, the transaction layer logic may then identify the BDI array corresponding to the identified virtual channel queue.

Storing (606) the BDI in an entry in the selected BDI array may be carried out by determining a location of a write pointer in the destination BDI array. Once the destination BDI array and entry are determined, the data flit is stored at the entry in the BDI array. The virtual channel queue and the corresponding BDI array may each have write pointers that track corresponding entries in each structure. The data flit may be written before or after the BDI, and the write pointers will direct the transaction layer logic to the correct destination entry in the structures that correspond to one another.

In view of the explanations set forth above, readers will recognize that the benefits of aligning received BDIs with received data on a cross-chip link according to embodiments of the present invention include:

Improving the operation of a computing system by reusing a control structure in the transaction layer in order to associate BDIs with data flits, increasing computing system efficiency.

Improving the operation of a computing system by leveraging clock speed to reduce hardware necessary to process BDIs in the transaction layer, increasing computing system efficiency.

Exemplary embodiments of the present invention are described largely in the context of a fully functional computer system for aligning received BDIs with received data on a cross-chip link. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus for aligning received bad data indicators (BDIs) with received data on a cross-chip link, the apparatus comprising a computer processor, a computer memory operatively coupled to the computer processor, the computer memory having disposed within it computer program instructions that, when executed by the computer processor, cause the apparatus to carry out the steps of:
   receiving, from the cross-chip link, a control flit of a frame, the control flit comprising incoming data flit information for a plurality of incoming data flits;
   adding the incoming data flit information to a control structure;
   receiving, from the cross-chip link, the plurality of incoming data flits in the frame;
   directing each of the plurality of incoming data flits to virtual channel queues based on the incoming data flit information in the control structure;
   after receiving all of the plurality of incoming data flits of the frame, receiving a bookend flit for the frame, the bookend flit comprising a plurality of BDIs for the plurality of data flits in the frame; and
   associating each of the BDIs with the plurality of data flits based on the incoming data flit information in the control structure.

2. The apparatus of claim 1, wherein the computer program instructions, when executed by the computer processor, further cause the apparatus to carry out the steps of:
   providing, from a transaction layer, the plurality of data flits and BDIs for the plurality of data flits to a host processing unit.

3. The apparatus of claim 2, wherein associating each of the BDIs with the plurality of data flits based on the incoming data flit information in the control structure comprises:
   processing, by a state machine, each BDI based on a clock cycle of the host processing unit.

4. The apparatus of claim 1, wherein directing each of the plurality of incoming data flits to virtual channel queues based on the incoming data flit information in the control structure comprises, for each incoming data flit:
- retrieving, from the control structure at a first read pointer, a virtual channel identifier;
- selecting a virtual channel queue based on the virtual channel identifier; and
- storing the incoming data flit in an entry in the selected virtual channel queue.

5. The apparatus of claim 1, wherein associating each of the BDIs with the plurality of data flits based on the incoming data flit information in the control structure comprises, for each BDI:
- retrieving, from the control structure at a second read pointer, a virtual channel identifier;
- selecting a BDI array based on the virtual channel identifier; and
- storing the BDI in an entry in the selected BDI array.

6. The apparatus of claim 1, wherein directing each of the plurality of incoming data flits to virtual channel queues based on the incoming data flit information in the control structure comprises:
- storing each of the plurality of incoming data flits in the virtual channel queues based on a location of a write pointer into the virtual channel queues.

7. The apparatus of claim 1, wherein the incoming data flit information comprises a virtual channel identifier and a length of each of the plurality of incoming data flits.

8. A computer program product for aligning received bad data indicators (BDIs) with received data on a cross-chip link, the computer program product disposed upon a computer readable medium, the computer program product comprising computer program instructions that, when executed, cause a computer to carry out the steps of:
- receiving, from the cross-chip link, a control flit of a frame, the control flit comprising incoming data flit information for a plurality of incoming data flits;
- adding the incoming data flit information to a control structure;
- receiving, from the cross-chip link, the plurality of incoming data flits in the frame;
- directing each of the plurality of incoming data flits to virtual channel queues based on the incoming data flit information in the control structure;
- after receiving all of the plurality of incoming data flits of the frame, receiving a bookend flit for the frame, the bookend flit comprising a plurality of BDIs for the plurality of data flits in the frame; and
- associating each of the BDIs with the plurality of data flits based on the incoming data flit information in the control structure.

9. The computer program product of claim 8, wherein the computer program instructions, when executed, cause the computer to further carry out the steps of:
- providing, from a transaction layer, the plurality of data flits and BDIs for the plurality of data flits to a host processing unit.

10. The computer program product of claim 9, wherein associating each of the BDIs with the plurality of data flits based on the incoming data flit information in the control structure comprises:
- processing, by a state machine, each BDI based on a clock cycle of the host processing unit.

11. The computer program product of claim 8, wherein directing each of the plurality of incoming data flits to virtual channel queues based on the incoming data flit information in the control structure comprises, for each incoming data flit:
- retrieving, from the control structure at a first read pointer, a virtual channel identifier;
- selecting a virtual channel queue based on the virtual channel identifier; and
- storing the incoming data flit in an entry in the selected virtual channel queue.

12. The computer program product of claim 8, wherein associating each of the BDIs with the plurality of data flits based on the incoming data flit information in the control structure comprises, for each BDI:
- retrieving, from the control structure at a second read pointer, a virtual channel identifier;
- selecting a BDI array based on the virtual channel identifier; and
- storing the BDI in an entry in the selected BDI array.

13. The computer program product of claim 8, wherein directing each of the plurality of incoming data flits to virtual channel queues based on the incoming data flit information in the control structure comprises:
- storing each of the plurality of incoming data flits in the virtual channel queues.

* * * * *